(12) United States Patent
Thurston

(10) Patent No.: US 7,443,939 B2
(45) Date of Patent: Oct. 28, 2008

(54) METHODS OF, AND APPARATUS FOR, SYNCHRONIZING A RECEIVER WITH A RECEIVED SIGNAL

(75) Inventor: Andrew Thurston, Cambridgeshire (GB)

(73) Assignee: Ubinetics Limited, Melbourn, Hertfordshire (GB)

( * ) Notice: Subject to any disclaimer, the term of this patent is extended or adjusted under 35 U.S.C. 154(b) by 641 days.

(21) Appl. No.: 10/416,297

(22) PCT Filed: Nov. 1, 2001

(86) PCT No.: PCT/GB01/04847

§ 371 (c)(1), (2), (4) Date: May 8, 2003

(87) PCT Pub. No.: WO02/39607

PCT Pub. Date: May 16, 2002

(65) Prior Publication Data

US 2004/0081262 A1  Apr. 29, 2004

(30) Foreign Application Priority Data

Nov. 10, 2000 (GB) .................................. 0027540.4

(51) Int. Cl.
*H04L 7/00* (2006.01)
*H04J 3/06* (2006.01)
(52) U.S. Cl. ...................... 375/365; 370/503
(58) Field of Classification Search ......... 375/140–142, 375/145, 147–148, 150, 340–343, 362–368; 370/503, 509–514, 362–368
See application file for complete search history.

(56) References Cited

U.S. PATENT DOCUMENTS

| 4,833,694 A | * | 5/1989 | Young et al. ............... 375/285 |
| 6,625,200 B1 | * | 9/2003 | Dent ........................... 375/142 |
| 2004/0081262 A1 | * | 4/2004 | Thurston ..................... 375/343 |

FOREIGN PATENT DOCUMENTS

| JP | 9055727 | * | 2/1997 |
| JP | 10112672 | * | 4/1998 |
| JP | 11205194 A | | 7/1999 |
| WO | 9507577 A1 | | 3/1995 |
| WO | 0067399 A1 | | 11/2000 |

OTHER PUBLICATIONS

Human traslation of Hideki (JP 9055727).*

* cited by examiner

*Primary Examiner*—Khai Tran
(74) *Attorney, Agent, or Firm*—Banner & Witcoff, Ltd.

(57) ABSTRACT

The invention provides a receiver that is capable of deducing the timing of a received signal having a frame structure and corresponding methods. Each frame contains a synchronization word. The receiver correlates the known synchronization word against the received signal to determine the position of the synchronization word. The correlation results can be accumulated over several frames' worth of the signal in order to enhance the determination. The frame boundaries within the signal can be translated and the process of determining the synchronization word position can then be repeated. In this manner, several results for the synchronization word position can be obtained and the best selected. A thresholding process can be used to curtail the number of frames' worth of the received signal that needs to be processed and a mechanism is provided to prevent the thresholding process from biasing the determination of the synchronization word position.

13 Claims, 2 Drawing Sheets

METHODS OF, AND APPARATUS FOR, SYNCHRONIZING A RECEIVER WITH A RECEIVED SIGNAL

The invention relates to methods and apparatus for time aligning a receiver with a received signal. In particular, the invention relates to determining the position of a known synchronisation marker or data-string in a received signal to facilitate the carrying out of other processes (such as frequency locking and data decoding) on the received signal.

The frame structure of a signal received by, for example, a mobile telephone, is shown in FIG. 1. The received signal comprises a sequence of consecutive chips, each of a fixed duration. Each chip comprises a pair of I (in-phase) and Q (quadrature) values and in that sense each chip, r, is a complex number $r=r_x+j\, r_y$, where $r_x$ and $r_y$ represent, respectively, the I and Q values comprising the chip. Each of the IQ chip pairs can be thought of as a symbol. As shown in FIG. 1, the frame structure comprises a frame 38400 chips long. The frame is constituted by 15 consecutive power control periods (PCP), each 2560 chips long. Each PCP comprises 10 consecutive slots, each 256 chips long. One of the slots (in each PCP) contains a synchronisation word (SW) which is 256 chips, or symbols, in length.

The apparatus receiving the signal of FIG. 1, searches the received signal looking for the synchronisation word (SW) so that the receiver can time align itself with the received signal to achieve frequency locking and correct decoding of the received information.

Conventional methods of time-aligning a receiver with a received signal are time consuming and computationally intensive.

The present invention aims to ameliorate these problems.

According to one aspect, the invention provides a method of synchronising a receiver to a received signal comprising a series of chips arranged in successive periods, the method comprising correlating a synchronisation word with a number of period lengths of the received signal, accumulating the correlation results to produce first cumulative correlation results, and examining the first cumulative correlation results to determine the position of the synchronisation word in the received signal, wherein said number is truncated where the first cumulative correlation results exceed a threshold.

According to a related aspect, the invention provides a computer program for implementing the method.

According to another aspect, the invention provides apparatus for synchronising a receiver to a received signal comprising a series of chips arranged in successive periods, the apparatus comprising correlating means for correlating a synchronisation word with a number of period-lengths of the received signal, accumulating means for accumulating the correlation results to produce first cumulative correlation results, and examining means for examining the first cumulative correlation results to determine the position of the synchronisation word in the received signal, wherein the apparatus further comprises truncating means for truncating said number where the first cumulative correlation results exceed a threshold.

By providing that the correlation process may be truncated, the synchronisation process operates more efficiently.

In one embodiment, the beginnings of the period lengths can be displaced by, say, a fraction of a chip. The synchronisation word can be correlated against a number of the shifted lengths to produce second cumulative correlation results. This is advantageous in that performing the correlation again using a shifted frame of reference of the period lengths enhances resolution, i.e. the position of the synchronisation word in the received signal may be located with greater precision. The accumulation process used in producing the second (or third, or fourth, etc.) cumulative correlation results can be limited to the same number of period lengths that was used to generate the first cumulative correlation results. A further advantage arises from the fact that the first and second cumulative correlation results have been produced on the basis of the same number of period lengths. This means that if the first and second cumulative correlation results are compared to locate the synchronisation word in the received signal the one set of cumulative correlation results is not biased relative to the other.

The threshold used in the truncation may be predetermined or it may be determined dynamically.

In the synchronisation process, the receiver operates on a test section of the incoming signal which is at least one period length in duration. Preferably, the receiver operates on a section which is 3 to 8 period lengths in duration. Of course, the number of period-lengths used in the correlation process will be reduced where the truncation intercedes.

In a preferred embodiment, the receiver is a UMTS receiver and the synchronisation word is a primary synchronisation sequence, PSCH.

By way of example only, an embodiment of the invention will now be described with reference to FIG. 1 in which:

It will be apparent that a period length need not be synchronised with the periods of the received signal.

Figure 1:
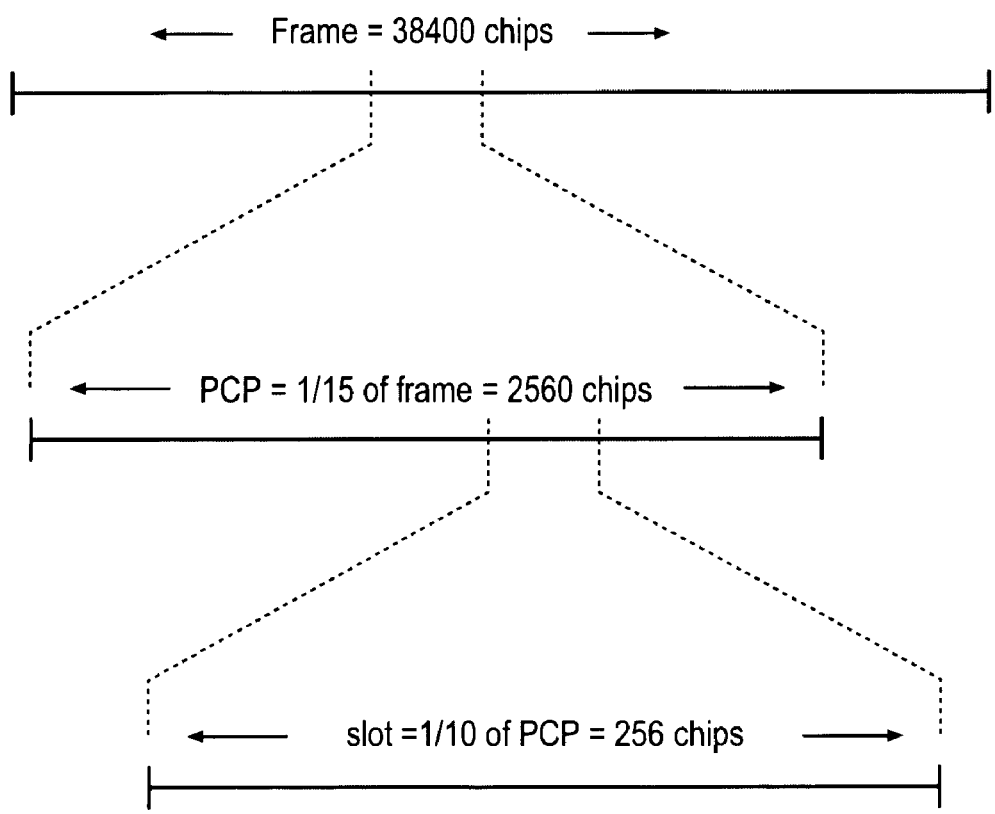
FIG. 1 illustrates the frame structure of a received signal.
Figure 2:
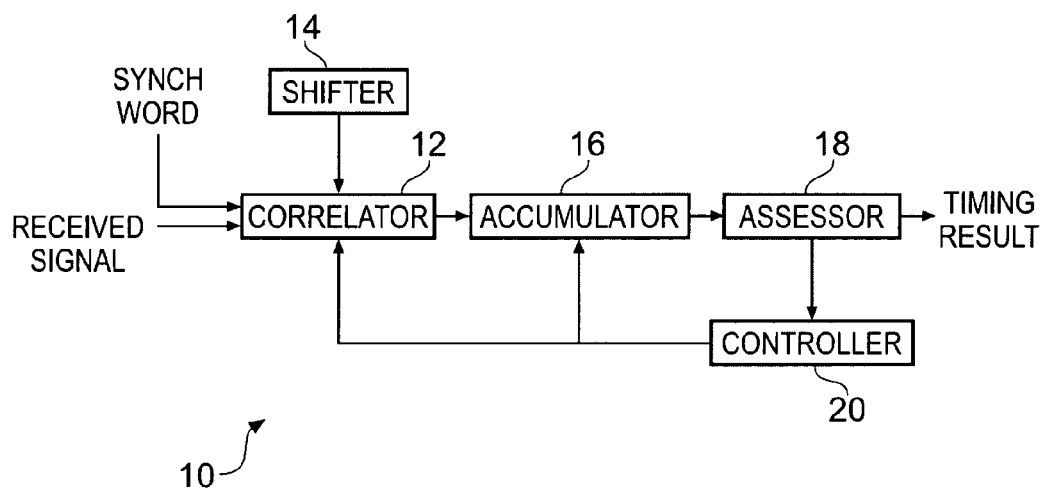
FIG. 2 is a schematic diagram of an apparatus for synchronizing a receiver to a received signal.

In this embodiment, the receiver operates on a signal having the frame structure discussed earlier with reference to FIG. 1. The receiver performs the synchronisation process by operating on a test length of the received signal which is (according to default criteria) 6 PCPs long.

The receiver correlates the SW with the PCP length using the equation:

$$P_k = \left(\sum_{i=0}^{255} (s_i \cdot r_{x(i+k)})\right)^2 + \left(\sum_{i=0}^{255} (s_i \cdot r_{y(i+k)})\right)^2$$

Where:

$S_i$ is a scalar quantity indicating the ith chip of the SW;

$r_{x(i+k)}$ indicates the in-phase component of the (i+k) the chip ($r_{(i+k)}$) of the PCP-length of the test section; and $r_{y(i+k)}$ indicates the quadrature component of the (i+k) the chip ($r_{(i+k)}$) of the PCP-length of the test section.

The correlation result is denoted by the letter P (for power, since the result of the multiplication is the square of a signal magnitude, which is dimensionally the same as power). The index k means that the correlation value P has been produced by multiplying the chips of the SW with chips k to k+255 of the PCP-length. The correlation value for $P_k$ would be high if it happened that $r_k$ was the first chip of the occurrence of the SW in the PCP-length. The correlation process can be repeated for each chip of the received signal to test if the occurrence of the SW in the PCP length occurred at that chip, i.e. $P_k$ can be calculated for each of k=0 to 2559. Thus, an array of 2560 P values is created for the PCP-length. This array is called the "power" array.

To introduce a degree of averaging into the process, the values $P_k$ are calculated for the next PCP-length of the test section. The new power array is summed with the previous power array to produce a cumulative power array. In the cumulative power array, the kth element contains the sum of the kth power values from the first and second PCP lengths.

The procedure then continues by calculating 4 further $P_k$ arrays, so that all 6 PCP-lengths of the test section of the received signal are produced. Each time a new $P_k$ value is produced, it is added to the kth value of the cumulative power array. After all 6 PCP-lengths are processed the cumulative power array becomes the final power array. The largest value in the final array can be said to identify the first chip of the occurrence of the SW in the received signal, thus allowing synchronisation of the receiver with the signal being received.

It is possible to translate the chip boundaries in the test section by a one-half chip offset. The correlation process can then be repeated, calculating a power array for each PCP-length and building up another final power array. This new final power array will contain a maximum value indicating the initial chip of the SW in the received signal. The maximum values from the original final power array and the new final power array can be compared and the greater of the two be taken to indicate the position of the initial chip of the SW in the received signal. It will be appreciated that this is a way of increasing the resolution of the process of locating the SW in the received signal. Furthermore, it will be appreciated that the chip boundaries in the test section could be shifted by other fractions of a chip. In fact, a final power array could be calculated for each of any number of offsets (each offset being a different fraction of a chip) to increase the resolution further.

To expedite the determination of the SW position in the received signal, a truncation decision is used in the process of calculating a final power array. Prior to beginning the calculation of a $P_k$ array for each of the second and subsequent PCP lengths (here, the 2nd to 6th PCP-lengths), the receiver checks the cumulative power array to determine if any of the k elements therein exceeds predetermined a threshold. If so, the cumulative power array becomes the final power array and no further PCP lengths are processed in the creation of that final power array.

Where plural final power arrays are created (on the basis of different chip-fraction offsets), it will be apparent that each final array must be based on the same number of accumulated power arrays $P_k$ (or PCP-lengths). Otherwise, the final power arrays could not be compared on a fair basis for determining the position of the synchronisation word on the received signal. Hence, if a truncation of the number of PCP-lengths processed in the creation of the first final power array, occurs then the same truncation is applied in the creation of all the subsequent final power arrays (without recourse to threshold comparison).

The invention claimed is:

1. A method of synchronizing a receiver to a received signal comprising a series of chips arranged in successive periods, the method comprising:
    correlating a synchronization word with at least one period-length of the received signal;
    accumulating the correlation results to produce first cumulative correlation results; terminating the accumulation of the first cumulative correlation results after processing a first number of said period-lengths when the first cumulative correlation results exceed a threshold;
    examining the first cumulative correlation results to make a first determination of the position of the synchronization word in the received signal:
    displacing the beginnings of the period-lengths to produce a second number of shifted lengths;
    correlating the synchronization word with said first number of shifted lengths to produce second cumulative correlations results; and
    examining the second cumulative correlation results to make a second determination of the position of the synchronization word in the received signal.

2. The method according to claim 1, wherein the beginnings of the period-lengths are displaced by a fraction of a chip.

3. The method according to claim 1, wherein the step of correlating the synchronization word with a period-length comprises generating a correlation value for each chip position in the period length by correlating the synchronization word with a sequence of chips beginning at that chip position.

4. The method according to claim 3, wherein accumulating correlation results comprises summing the correlation values derived from a chip position in different period-lengths.

5. The method according to claim 3, wherein the step of examining cumulative correlation results comprises locating a maximum correlation value in the cumulative correlation results.

6. The method according to claim 5, wherein, in the step of examining cumulative correlation results, a located maximum correlation value is deemed to indicate the beginning of the synchronization word in the received signal.

7. A computer readable medium containing computer-executable instructions for causing a data processing apparatus to synchronize a receiver to a received signal, comprising a series of chips arranged in a successive periods, by performing the steps comprising:
    correlating a synchronization word with at least one period-length of the received signal;
    accumulating the correlation results to produce first cumulative correlation results;
    terminating the accumulation of the first cumulative correlation results after processing a first number of said period-lengths when the first cumulative correlation results exceed a threshold;
    examining the first cumulative correlation results to make a first determination of the position of the synchronization word in the received signal; displacing the beginnings of the period-lengths to produce a second number of shifted lengths;
    correlating the synchronization word with said first number of shifted lengths to produce second cumulative correlation results; and
    examining the second cumulative correlation results to make a second determination of the position of the synchronization word in the received signal.

8. An apparatus for synchronizing a receiver to a received signal comprising a series of chips arranged in successive periods, the apparatus comprising:
    a correlator for correlating a synchronization word with at least one period-length of the received signal;
    an accumulator for accumulating the correlation results to produce first cumulative correlation results; an assessor for examining the first cumulative correlation results make a first determination of the position of the synchronization word in the received signal;
    a controller for terminating the accumulation of the first cumulative correlation results after processing a first number of said period-lengths if the first cumulative correlation results exceed a threshold;
    an assessor for examining the first cumulative correlation results to make a first determination of the position of the synchronization word in the received signal; and
    a shifter for displacing the beginnings of the period-lengths to produce a second number of shifted lengths;

wherein:
    the controller is arranged to correlate the synchronization word with said first number of shifted lengths to produce second cumulative correlation results; and the assessor is arranged to examine the second cumulative correlation results to make a second determination of the position of the synchronization word in the received signal.

9. The apparatus according to claim 8, wherein the shifter is arranged to displace the beginnings of the period-lengths by a fraction of a chip.

10. The apparatus according to claim 8, wherein the correlator is arranged to generate a correlation value for each chip position in a period-length by correlating the synchronization word with a sequence of chips beginning at that chip position.

11. The apparatus according to claim 10, wherein the accumulator is arranged to sum the correlation values derived for a chip position in different period-lengths.

12. The apparatus according to claim 10, wherein the assessor is arranged to locate a maximum correlation value in the cumulative correlation results.

13. The apparatus according to claim 12, wherein the assessor is arranged to deem a maximum correlation value as indicating the beginning of the synchronization word in the received signal.

* * * * *

UNITED STATES PATENT AND TRADEMARK OFFICE
CERTIFICATE OF CORRECTION

PATENT NO.        : 7,443,939 B2                                    Page 1 of 1
APPLICATION NO. : 10/416297
DATED             : October 28, 2008
INVENTOR(S)       : Andrew Thurston It is certified that error appears in the above-identified patent and that said Letters Patent is hereby corrected as shown below:

On the cover page item (73) Assignee:
    Please replace "Ubinetics Limited" with "Ubinetics (VPT) Limited"

Signed and Sealed this

Thirty-first Day of March, 2009

JOHN DOLL
*Acting Director of the United States Patent and Trademark Office*